(12) United States Patent
Lung

(10) Patent No.: US 10,556,735 B2
(45) Date of Patent: Feb. 11, 2020

(54) VACUUM SEALED CONTAINER AND METHOD

(71) Applicant: Alex Lung, Diamond Bar, CA (US)

(72) Inventor: Alex Lung, Diamond Bar, CA (US)

(*) Notice: Subject to any disclaimer, the term of this patent is extended or adjusted under 35 U.S.C. 154(b) by 315 days.

(21) Appl. No.: 15/644,633

(22) Filed: Jul. 7, 2017

(65) Prior Publication Data
US 2019/0009966 A1  Jan. 10, 2019

(51) Int. Cl.
| | |
|---|---|
| *B65D 81/20* | (2006.01) |
| *B65D 25/54* | (2006.01) |
| *B65D 43/02* | (2006.01) |
| *B65D 85/00* | (2006.01) |
| *B65D 81/38* | (2006.01) |
| *B65B 7/28* | (2006.01) |
| *B65B 5/04* | (2006.01) |
| *B65B 31/00* | (2006.01) |
| *G02B 25/00* | (2006.01) |

(52) U.S. Cl.
CPC ............ *B65D 81/2038* (2013.01); *B65B 5/04* (2013.01); *B65B 7/2835* (2013.01); *B65B 31/00* (2013.01); *B65D 25/54* (2013.01); *B65D 43/0231* (2013.01); *B65D 81/3841* (2013.01); *B65D 85/70* (2013.01); *G02B 25/002* (2013.01); *B65D 2543/00537* (2013.01)

(58) Field of Classification Search
CPC ........................ B65D 81/2038; B65D 81/3841; B65D 25/54; B65D 85/70; B65D 51/1661; B65D 51/1644; B65B 5/04

USPC .......................................................... 215/260
See application file for complete search history.

(56) References Cited

U.S. PATENT DOCUMENTS

| | | | | |
|---|---|---|---|---|
| 5,957,317 A | * | 9/1999 | Lee .................... | B65D 81/2038 215/228 |
| 2005/0045495 A1 | * | 3/2005 | Dalsing ................ | A45C 11/005 206/5.1 |
| 2005/0211656 A1 | * | 9/2005 | Muir ...................... | B65D 51/24 215/228 |

* cited by examiner

*Primary Examiner* — King M Chu
(74) *Attorney, Agent, or Firm* — Tommy SF Wang; Wang IP Law Group, P.C.

(57) ABSTRACT

The present application discloses a vacuum sealed container, including a container body, a container lid, a vacuum generator and at least one magnifier. The container body includes a first wall and a bottom surface, wherein the first wall and the bottom surface define an accommodation space. The container lid is coupleable to the container body. The vacuum generator coupled to the container lid to evacuate fluid from the accommodation space. The at least one magnifier coupled to the bottom surface of the container body and are molded integrally. In addition, the at least one magnifier and the bottom surface of the container body are light-permeable, wherein the at least one magnifier is a lens. A method for using the aforementioned vacuum sealed container is also disclosed.

17 Claims, 7 Drawing Sheets

VACUUM SEALED CONTAINER AND METHOD

TECHNICAL FIELD OF THE INVENTION

The present application generally relates to containers, and more particularly, to vacuum sealed container and method for using the vacuum sealed container.

BACKGROUND OF THE INVENTION

Substances such as metal or edible materials are easily oxidized when exposing to the air. Such substances are generally preserve in sealed boxes. However, they are still easily ruined or staled by the air inside the sealed boxes.

In addition, it is difficult to notice tiny oxidized portions in delicate substances such as tea leaves or coffee grounds. Therefore, a need remains for a vacuum sealed container to provide an improved preservative and examinable environment for easily oxidized substances.

SUMMARY OF THE INVENTION

The present application discloses a vacuum sealed container and method for providing a better preservative and examinable environment for easily oxidized substances.

The vacuum sealed container comprises a container body, a container lid, a vacuum generator and at least one magnifier. The container body comprises a first wall and a bottom surface, wherein the first wall and the bottom surface define an accommodation space. The container lid is coupleable to the container body. The vacuum generator coupled to the container lid to evacuate fluid from the accommodation space. The at least one magnifier coupled to the container body.

According to an exemplary embodiment of the vacuum sealed container, the at least one magnifier is coupled to the bottom surface of the container body and are molded integrally. In addition, the at least one magnifier and the bottom surface of the container body are light-permeable, wherein the at least one magnifier is a lens.

According to the other exemplary embodiment, the vacuum generator comprises a cover, a button and a main body. The cover is coupled to the container lid. The button is coupled to the cover. The main body comprises a side wall, a plate and a flange, wherein the button is connected at a first location of the plate in a pressed state, forming a first fluid passage between the flange and the button. Furthermore, the button is connected at a second location of the flange in a released state, forming a second fluid passage between the plate and the button.

According to the other exemplary embodiment, the main body further comprises a chamber coupled between the plate and the side wall. The chamber comprises an opening, the accommodation space is in fluid communication with the chamber via the first fluid passage, the second fluid passage and the opening. The main body and the chamber are molded integrally.

According to the other exemplary embodiment, the vacuum sealed container is cylindrical and the container lid is a screw-off lid.

According to the other exemplary embodiment, the vacuum generator further comprises a sealing ring coupled between the container body and the main body.

According to the other exemplary embodiment, the container body further comprises a second wall, a top surface and a base. An insulation space is defined between the first wall and the second wall. The top surface and the base are disposed between the first wall and the second wall.

In various exemplary embodiments, the vacuum sealed container further comprises a fixing member and a locking member. The fixing member is coupled to the container body. The locking member is coupled to the container lid.

A method for using the aforementioned vacuum sealed container is also disclosed. The method comprises placing an item in the accommodation space; mating the container lid and the vacuum generator with the container body; and evacuating the fluid from the accommodation space.

In various exemplary embodiments, after evacuating the fluid from the accommodation space, the method further comprises examining the item through the magnifier.

In various exemplary embodiments, after placing the item in the accommodation space, the method further comprises viewing the item through a bottom surface of the container body, wherein the bottom surface is light-permeable.

Based on the above, the present application allows users to preserve easily oxidized substances by providing vacuum environment. In addition, users can check the substances inside the container with the light-permeable bottom surface without opening the container lid. Furthermore, the tiny oxidized portions also can be clearly examined since a magnifier is disposed on the bottom surface of the container body.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Figure 1:
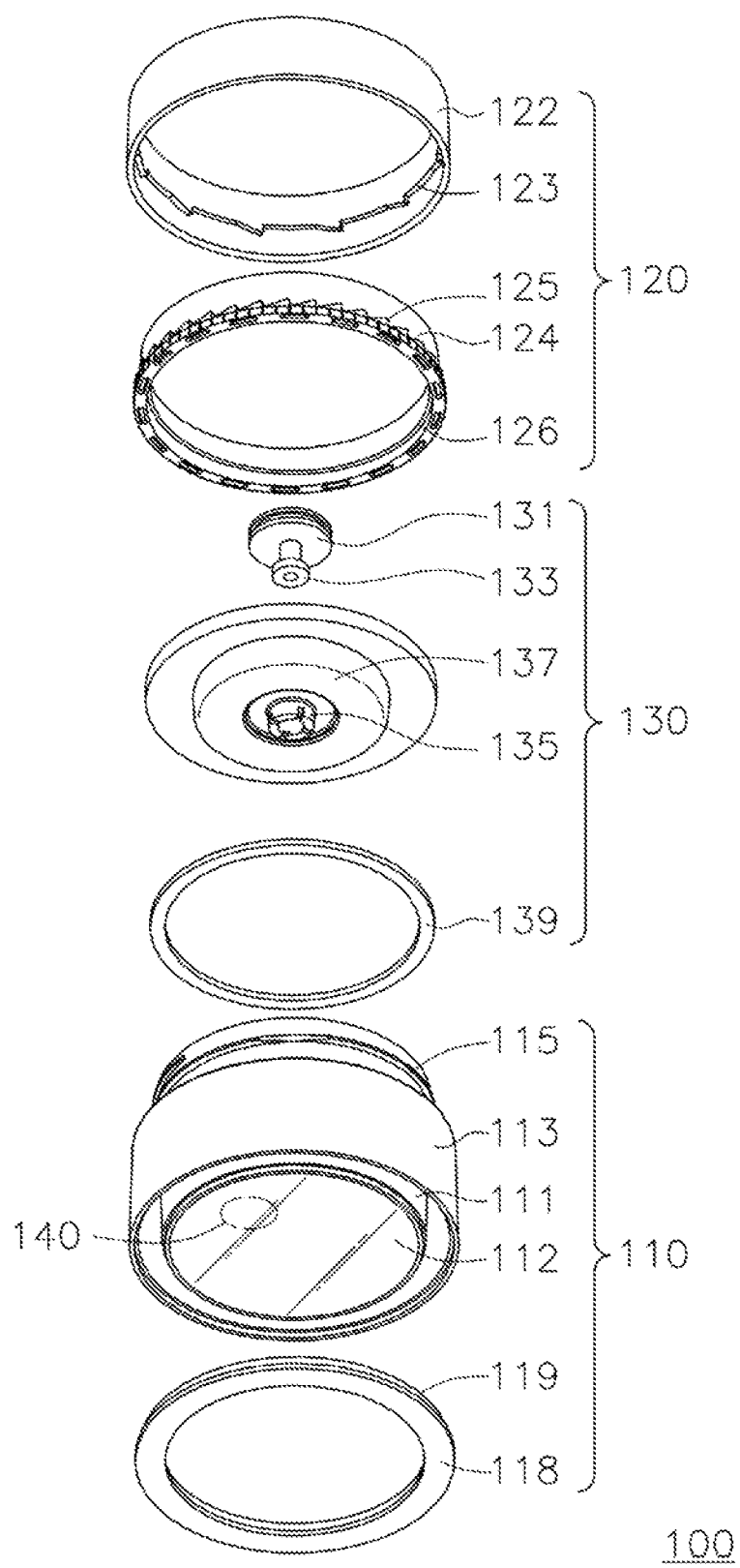
FIG. 1 is an explosive view of a vacuum sealed container.

Reference will now be made in detail to the present representative embodiments of the present application, examples of which are illustrated in the accompanying drawings. Wherever possible, the same reference numbers are used in the drawings and the description to refer to the same or like parts.

Figure 2:
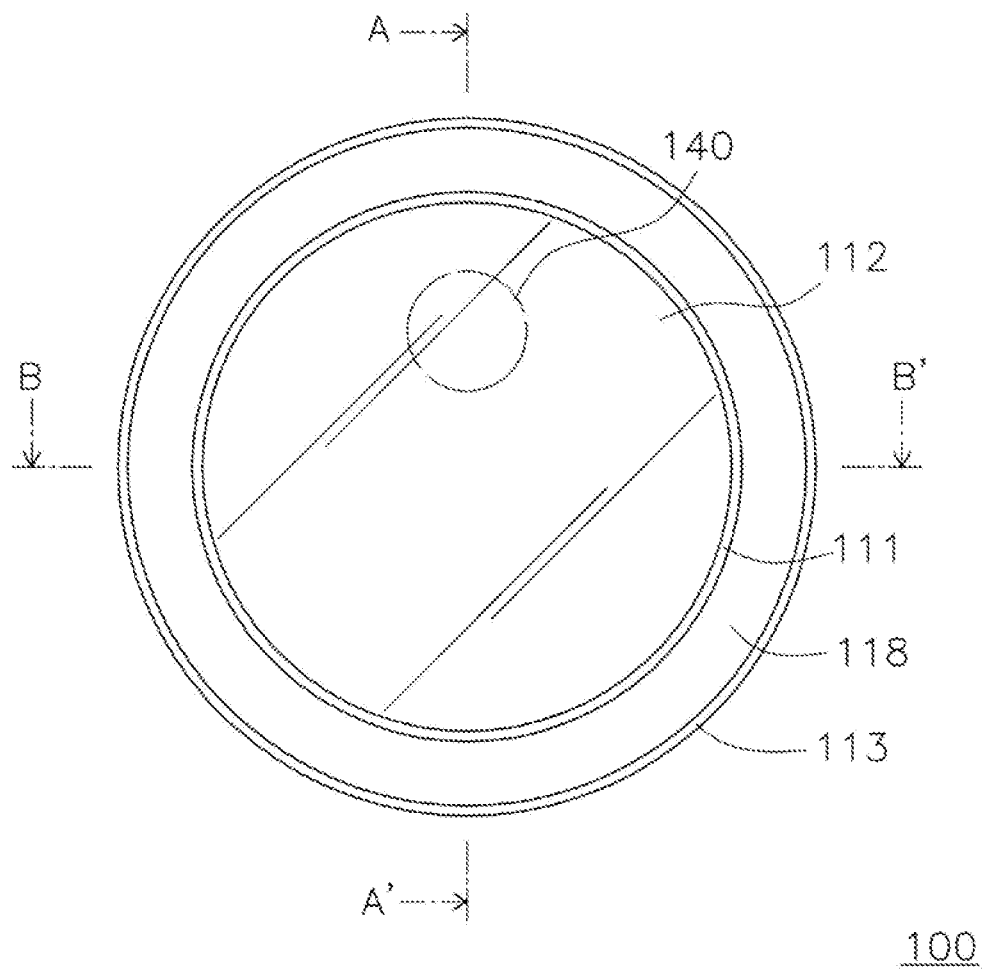
FIG. 2 is a bottom view of the vacuum sealed container.
Figure 3:
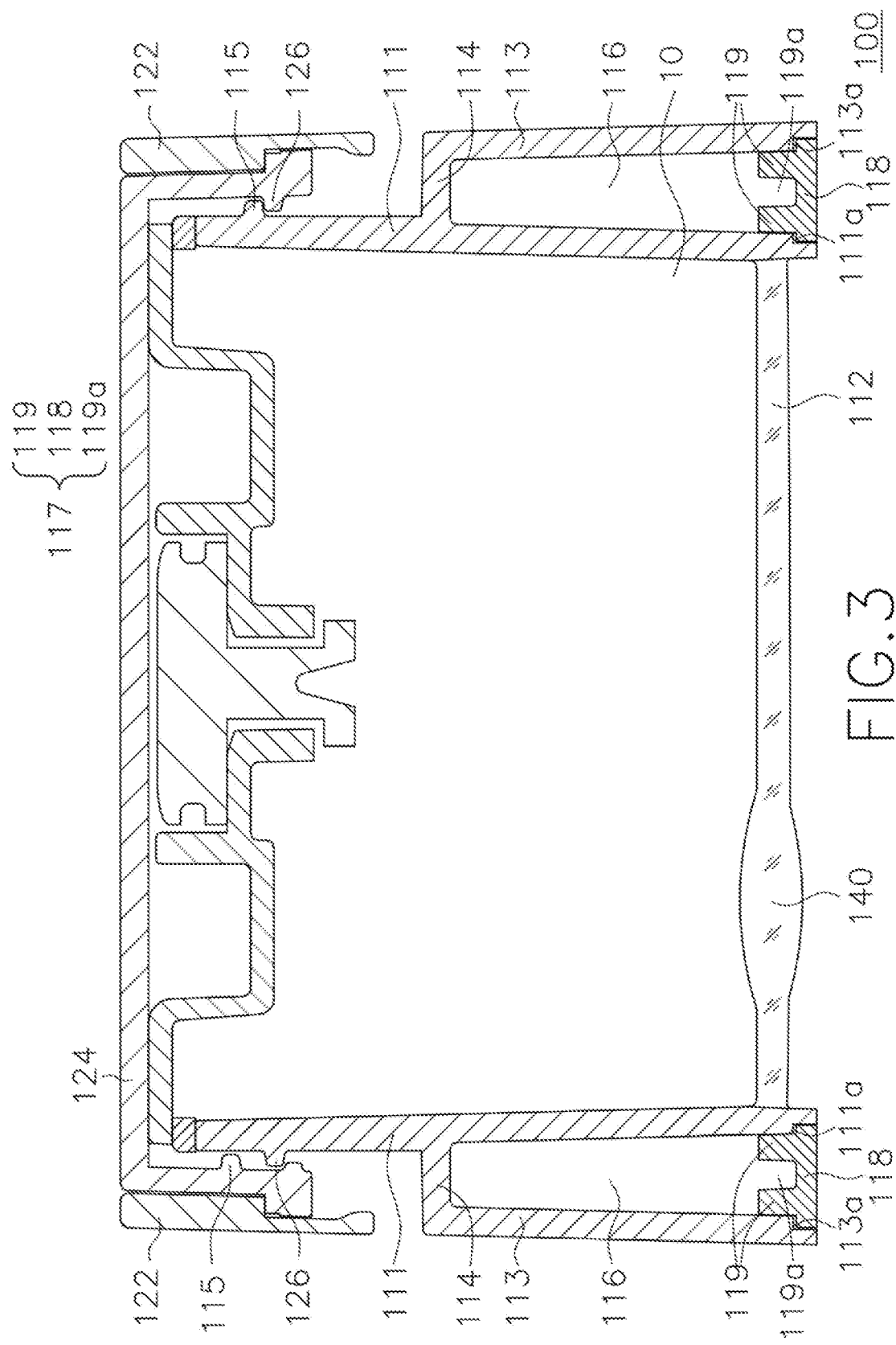
FIG. 3 is a cross-sectional view through an A-A' plane of the vacuum sealed container of FIG. 2.

FIG. 1 is an explosive view of a vacuum sealed container 100. FIG. 2 is a bottom view of the vacuum sealed container 100. FIG. 3 is a cross-sectional view through an A-A' plane of the vacuum sealed container 100 of FIG. 2.

Referring to FIGS. 1-3, the vacuum sealed container 100 comprises a container body 110, a container lid 120, a vacuum generator 130 and a magnifier 140. The container body 110 comprises a first wall 111, a bottom surface 112, a second wall 113 and a top surface 114. The first wall 111 and the bottom surface 112 define an accommodation space 10. The top surface 114 is disposed between the first wall 111 and the second wall 113. The first wall 111, the top surface 114 and the second wall 113 define an insulation space 116. In addition, a seal 117 is disposed under the container body 110 to seal the insulation space 116. Specifically, the first wall 111 has recess 111a and the second wall 113 has recess 113a. The seal 117 comprises a base 118 and ribs 119. The ribs 119 are coupled to the base 118. A groove 119a is configured between ribs 119 to strengthen the fixed structure. The ribs 119 are fixed inside the insulation space 116 by fixing both ends of base 118 inside recess 111a and recess 113a respectively.

It should be noted that every elements of container body 110 such as the first wall 111, the top surface 114, the second wall 113 and the seal 117 may be molded separately or integrally and are not limited. The container body 110 embodiment in present application is illustrated as molding the first wall 111, the top surface 114 and the second wall 113 integrally, and installing the seal 117 separately as an example. In addition, the container body 110 can be made of any materials such as plastic, metal or wood, and each elements of container body 110 may also be made of different materials, the present application is not limited thereto.

Referring to FIGS. 2-3, the magnifier 140 is coupled to the container body 110. Specifically, the magnifier 140 is coupled to the bottom surface 112 of the container body 110. In addition, the magnifier 140 and the bottom surface 112 of the container body 110 are molded integrally and comprise light-permeable materials such as glass or crystal. It should be noted that the materials may be anything as long as users can see substances inside the accommodation space 10. In detail, the magnifier 140 and the bottom surface 112 may comprise any transparent or translucent materials, the present application is not limited thereto.

Furthermore, the vacuum sealed container 100 may have any number of magnifiers and is not limited; the vacuum sealed container 100 embodiments are illustrated as having only one magnifier 140 as an example. Meanwhile, the location of the magnifier 140 may also be anywhere on the vacuum sealed container 100 as long as the users can examine the substances inside the accommodation space 10 with a magnified view. The magnifier 140 here is illustrated as being located at an edge of the bottom surface 112 as an example and is not limited thereto. In addition, the magnifier 140 may be any types of magnifier, the present application here is shown as a lens for example. Also, the magnifier 140 may be any shape such as oval, square and pyramidal shape; the present application is shown as a circular shape for example.

Furthermore, referring to the FIGS. 1-3, the container lid 120 comprises a housing 122 and a cover 124. An inner surface of the housing 122 comprises a serration 123. An outer surface of the cover 124 comprises a buttress thread 124 coupled to the serration 123. It should be noted that the housing 122 and the cover 124 may be molded integrally or separately and is not limited; the vacuum sealed container 100 embodiments are illustrated as being molded separately as an example.

Figure 4:
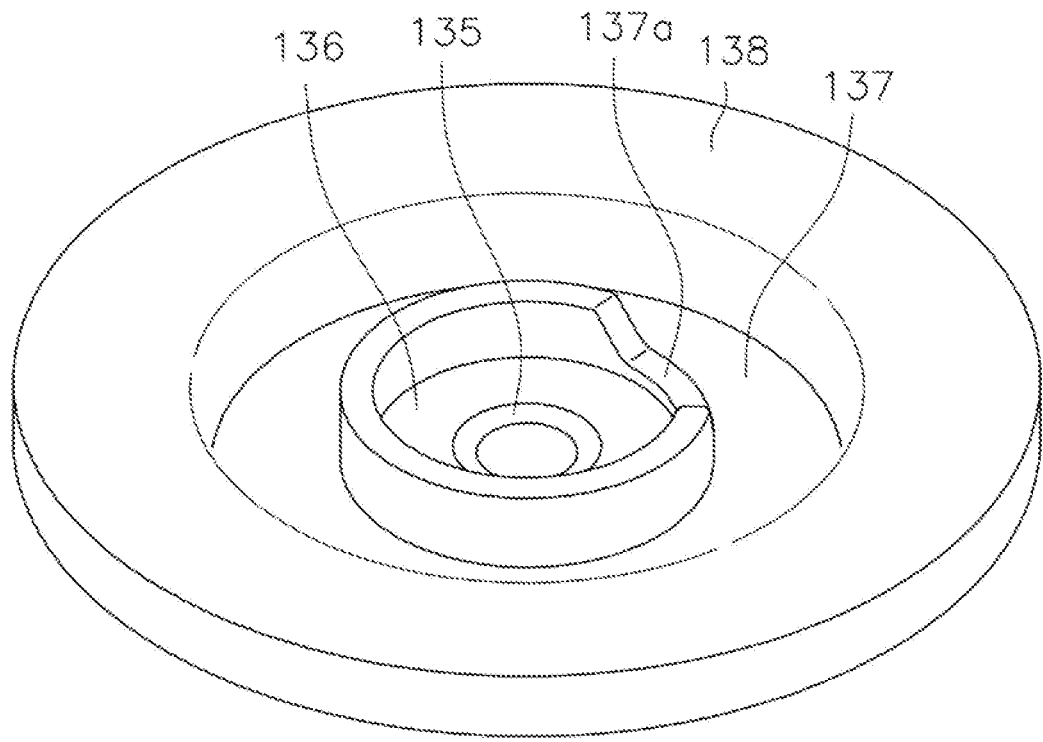
FIG. 4 is an isometric view of a main body of a vacuum generator of the vacuum sealed container.
Figure 5:
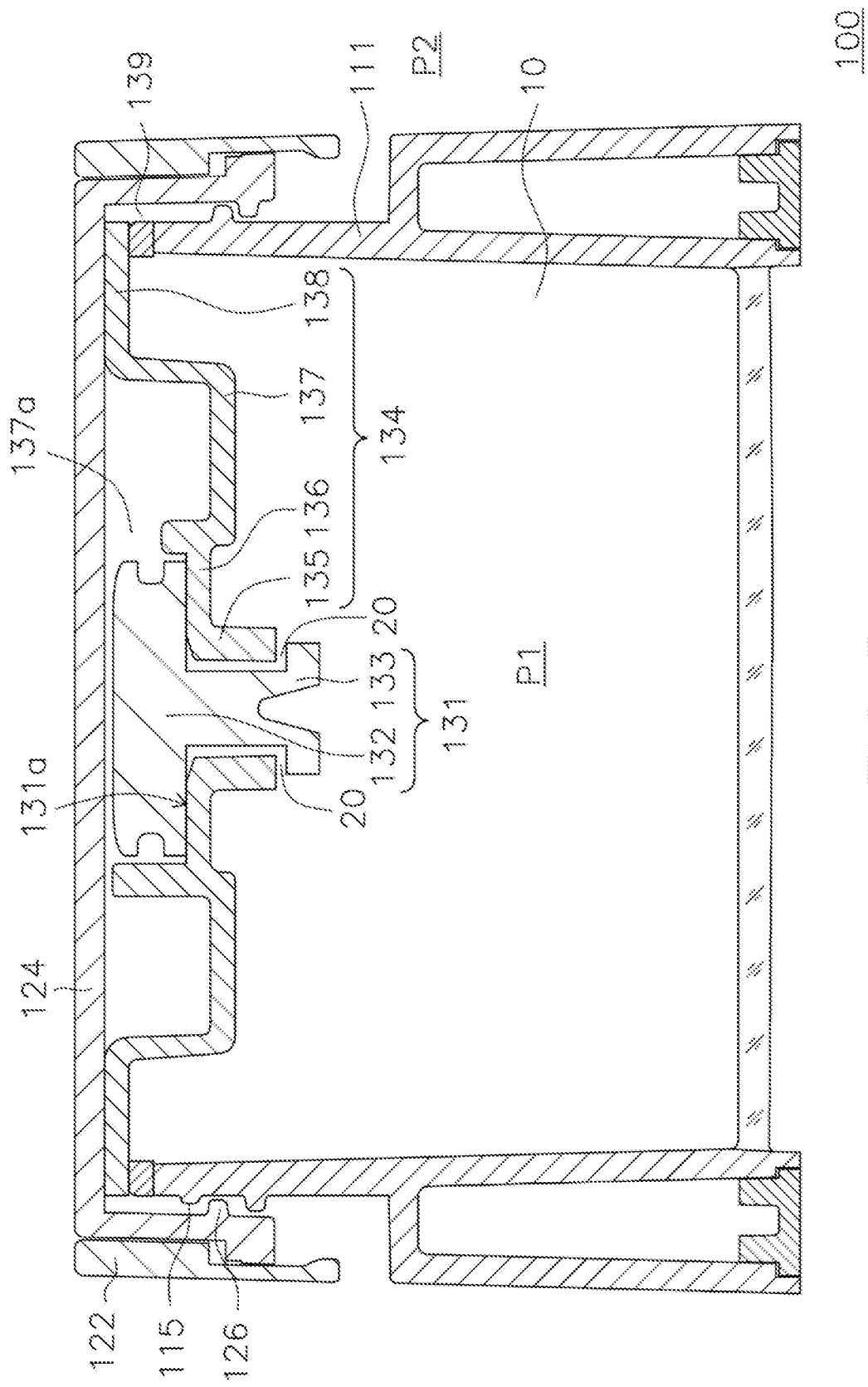
FIG. 5 is a cross-sectional view through a B-B' plane of the vacuum sealed container of FIG. 2 in a pressed state.
Figure 6:
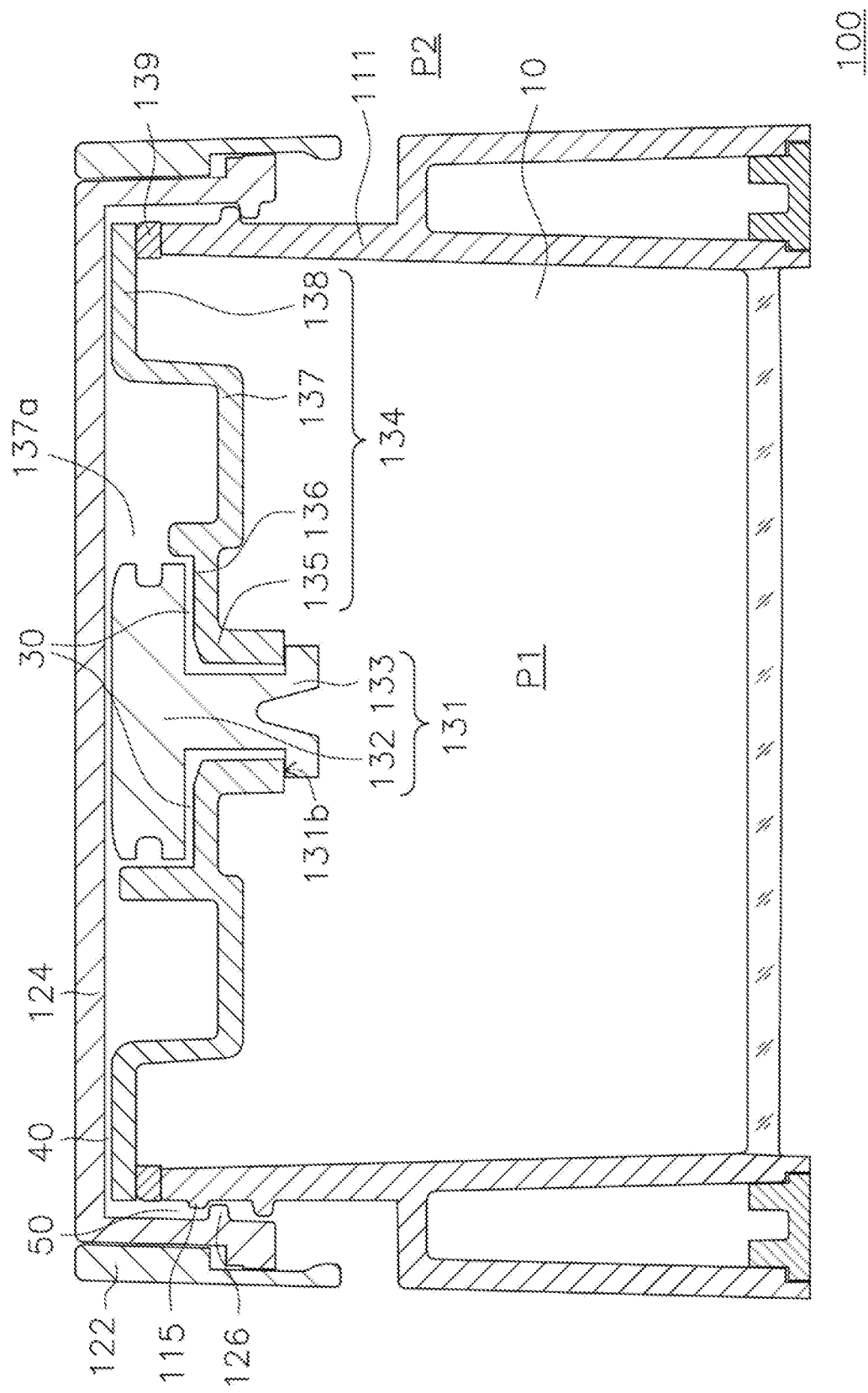
FIG. 6 is a cross-sectional view through a B-B' plane of the vacuum sealed container of FIG. 2 in a released state.

FIG. 4 is an isometric view of a main body 134 of a vacuum generator 130 of the vacuum sealed container 100. FIG. 5 is a cross-sectional view through a B-B' plane of the vacuum sealed container 100 of FIG. 2 in a pressed state. FIG. 6 is a cross-sectional view through a B-B' plane of the vacuum sealed container 100 of FIG. 2 in a released state.

Referring to the FIGS. 4-6, the vacuum generator 130 comprises a button 131, a main body 134 and a seal 139. The button comprises a T-shaped structure 132 and a resisting structure 133. The main body 134 comprises a flange 135, a plate 136, a chamber 137 and a plate 138. The T-shaped structure 132 is passed through the flange 135 of the main body 134 while the resisting structure 133 is located inside the accommodation space 10, making the button 131 be fixed within a fixed horizontal and vertical range. The chamber 137 is disposed between the plate 136 and the plate 138 and comprises an opening 137a. Specifically, the opening 137a is located on the wall between the plate 136 and the chamber 137. It should be noted that the opening 137a may be any shapes, any sizes and any locations, the present application is not limited thereto. The shape, size and location of the opening 137a as shown in FIG. 6 is only for an example. In addition, the flange 135, the plate 136, the chamber 137 and the plate 138 of the main body 134 may be molded integrally or separately and are not limited thereto; the main body 134 is illustrated as molded integrally as an example.

FIGS. 5-6 show the mechanism of how to evacuate fluid from the accommodation space 10. The fluid here may be any kinds of fluid such as single gas or mixed gas and is not limited. To be simplified, the fluid in the present application will be described as air for example.

Referring to the FIGS. 5-6, the seal 139 is coupled between the plate 138 of the main body 134 and the first wall 111 of the container body 110. The seal 139 prevents the air circulation through gaps between the main body 134 and the first wall 111.

Generally speaking, referring to the FIG. 5, when the user presses the container lid 120, the button 131 is connected at a first location 131a of the plate 135 in pressed state, forming a first fluid passage 20 between the flange 135 and the resisting structure 133 of the button 131. Referring to the FIG. 6, when user releases the container lid 120, the button 131 is connected at a second location 131b of the flange 135 in a released state, forming a second fluid passage 30 between the plate 135 and the T-shaped structure 132 of the button 131. In addition, a third fluid passage 40 and a fourth fluid passage 50 are also formed during released state. The third fluid passage 40 is between the plate 138 of the main body 134 and the cover 124 of the container lid 120. The fourth fluid passage 50 is between the first wall 111 of the container body 110 and the cover 124 of the container lid 120. The second fluid passage 30, the chamber 137, the third fluid passage 40, the fourth fluid passage 50 and the external environment are in fluid communication during released state as shown in FIG. 6.

Specifically, a pressure P1 in the accommodation space 10 becomes higher when pressing down the container lid 120, making the air flow into the first fluid passage 20. After releasing the container lid 120, since the pressure P1 in the accommodation space 10 is higher than a pressure P2 in the external environment in the released state, the air flows from the first fluid passage 20 through the second fluid passage 30 into the chamber 137 via the opening 137a, and then flows from the chamber 137 through the third fluid passage 40 and the fourth fluid passage 50 into the external environment.

Referring to the FIG. 1 and FIGS. 5-6, the vacuum seal container 100 is cylindrical and the container lid 120 is a screw-off lid. Specifically, the container body 110 further comprises a thread 115, and an inner surface of the cover 124 comprises a thread 126 coupled to the thread 115 of the container body 110. The seal 139 comprises compressible materials such as rubber, the present application is not limited thereto. By the structure mentioned above, the container lid 120 may be screwed on the container body 110 after evacuating the air from the accommodation space 10, making the accommodation body 10 maintain vacuum.

Furthermore, although the present application does not separately illustrate, the vacuum sealed container 100 may further comprise a fixing member and a locking member. The fixing member is coupled to the container body 110 and the locking member is coupled to the container lid 120. By the above mentioned structure, the fixing member and a locking member may work as a lock mechanism to prevent the vacuum sealed container 110 from being easily opened.

Figure 7:
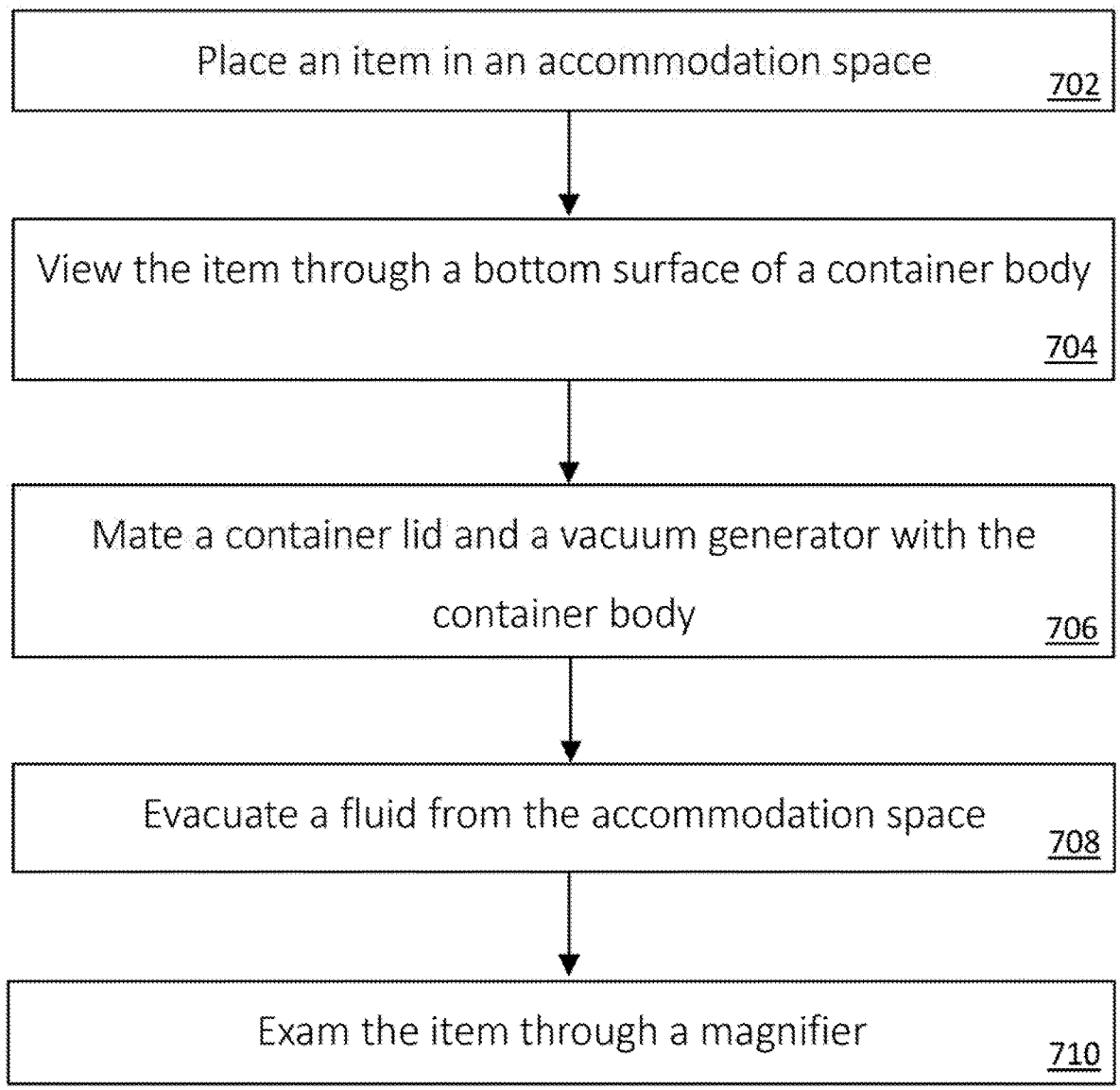
FIG. 7 is a flow chart of a method for using the vacuum sealed container.

FIG. 7 is a flow chart of a method for using the vacuum sealed container.

Referring to FIG. 7 with reference to FIGS. 1 and 3, the method includes an initial step 702 of placing an item (not separately illustrated) in the accommodation space 10. After that, viewing the item (not separately illustrated) through the light-permeable bottom surface 112 of the container body 110 as shown in step 704 for preliminary checking. Referring to step 706, then mating the container lid 120, the vacuum generator 130 with the container body 110. As shown in step 708, evacuating the fluid from the accommodation space 10 after installing the vacuum generator 130. Last, examining the item (not separately illustrated) through the magnifier 140 as shown in step 710 with amplified view.

Based on the above, the present application allows users to preserve easily oxidized substances by providing vacuum environment. In addition, users can check the substances inside the container with the light-permeable bottom surface without opening the container lid. By doing so, the substances can maintain in the vacuum environment without being exposed to the air, whether temporarily or permanently. Furthermore, the tiny oxidized portions also can be clearly examined since a magnifier is disposed on the bottom surface of the container body. Meanwhile, it is user-friendly to use pressing-style mechanism for evacuating the air from the vacuum sealed container.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A vacuum sealed container, comprising:
   a container body comprising a first wall and a bottom surface, wherein the first wall and the bottom surface define an accommodation space;
   a container lid being coupleable to the container body;
   a vacuum generator coupled to the container lid to evacuate fluid from the accommodation space, wherein the vacuum generator comprises:
      a button coupled to the container lid; and
      a main body comprising a plate and a flange, wherein the button is connected at a first location of the plate in a pressed state, forming a first fluid passage between the flange and the button; and
   at least one magnifier coupled to the container body.

2. The vacuum sealed container as claimed in claim 1, wherein the at least one magnifier is coupled to the bottom surface of the container body.

3. The vacuum sealed container as claimed in claim 2, wherein the at least one magnifier and the bottom surface of the container body are molded integrally.

4. The vacuum sealed container as claimed in claim 3, wherein the at least one magnifier and the bottom surface of the container body are light-permeable.

5. The vacuum sealed container as claimed in claim 4, wherein the at least one magnifier is a lens.

6. The vacuum sealed container as claimed in claim 1, wherein the button is connected at a second location of the flange in a released state, forming a second fluid passage between the plate and the button.

7. The vacuum sealed container as claimed in claim 6, wherein the main body further comprises a chamber coupled to the plate.

8. The vacuum sealed container as claimed in claim 7, wherein the chamber comprises an opening, the accommodation space is in fluid communication with the chamber via the first fluid passage, the second fluid passage and the opening.

9. The vacuum sealed container as claimed in, claim 8, wherein the main body and the chamber are molded integrally.

10. The vacuum sealed container as claimed in claim 6, wherein the vacuum sealed container is cylindrical.

11. The vacuum sealed container as claimed in claim 10, wherein the container lid is a screw-off lid.

12. The vacuum sealed container as claimed in claim 6, wherein the vacuum generator further comprises a seal coupled between the container body and the main body.

13. The vacuum sealed container as claimed in claim 6, wherein the container lid comprises:
   a housing; and
   a cover coupled to the housing, wherein the button of the vacuum generator is coupled to the cover.

14. A method for using a vacuum sealed container of claim 1, comprising:
   placing an item in the accommodation space;
   mating the container lid and the vacuum generator with the container body; and
   evacuating the fluid from the accommodation space.

15. The method for using a vacuum sealed container as claimed in claim 14, wherein after evacuating the fluid from the accommodation space, the method further comprises examining the item through the magnifier.

16. The method for using a vacuum sealed container as claimed in claim 14, wherein after placing the item in the accommodation space, the method further comprises viewing the item through a bottom surface of the container body, wherein the bottom surface is light-permeable.

17. A vacuum sealed container, comprising:
   a container body comprising:
      a first wall;
      a bottom surface, the first wall and the bottom surface define an accommodation space;
      a second wall, an insulation space is defined between the first wall and the second wall;
      a top surface between the first wall and the second wall; and
      a seal disposed between the first wall and the second wall, wherein the seal comprises:

a base coupled to the first wall and the second wall; and
at least one rib coupled to the base and fixed inside the insulation space:
a container lid being coupleable to the container body;
a vacuum generator coupled to the container lid to evacuate fluid from the accommodation, space; and
at least one magnifier coupled to the container body.

* * * * *